(12) United States Patent
Ji et al.

(10) Patent No.: US 12,174,883 B1
(45) Date of Patent: Dec. 24, 2024

(54) RETRIEVAL AND PUSH METHOD BASED ON FINE ART IMAGE TAG, AND USE THEREOF

(71) Applicant: Guangdong University of Technology, Guangzhou (CN)

(72) Inventors: Yi Ji, Guangzhou (CN); Zhenni Li, Guangzhou (CN); Yinghe Xiao, Guangzhou (CN); Yihui Cai, Guangzhou (CN); Junxian Lin, Guangzhou (CN); Jiayin Xiao, Guangzhou (CN); Shaolong Zheng, Guangzhou (CN); Jiaqi Xie, Guangzhou (CN); Xiaoying Guo, Guangzhou (CN)

(73) Assignee: Guangdong University of Technology (CN)

( * ) Notice: Subject to any disclaimer, the term of this patent is extended or adjusted under 35 U.S.C. 154(b) by 0 days.

(21) Appl. No.: 18/526,997

(22) Filed: Dec. 1, 2023

(51) Int. Cl.
*G06F 16/583* (2019.01)
*G06F 16/55* (2019.01)

(52) U.S. Cl.
CPC ............ *G06F 16/583* (2019.01); *G06F 16/55* (2019.01)

(58) Field of Classification Search
None
See application file for complete search history.

(56) References Cited

U.S. PATENT DOCUMENTS

| | | | |
|---|---|---|---|
| 2002/0136433 A1* | 9/2002 | Lin | G06V 40/173 382/118 |
| 2020/0167381 A1* | 5/2020 | Bustelo | G06Q 30/0631 |
| 2020/0327327 A1* | 10/2020 | Wu | G06N 20/10 |
| 2022/0083588 A1* | 3/2022 | Bustelo | G06Q 30/0603 |
| 2022/0318296 A1* | 10/2022 | Vang | G06F 16/5854 |
| 2023/0126839 A1* | 4/2023 | Sarin | G06V 20/80 382/224 |

FOREIGN PATENT DOCUMENTS

CN 111898696 A * 11/2020 ........... G06K 9/6256

* cited by examiner

*Primary Examiner* — Bernard Krasnic

(57) ABSTRACT

The present disclosure provides a retrieval and push method based on a fine art image tag, including the following steps: establishing a tag model database: training different tag contents with training samples of different subjects and different categories, and categorizing the training samples in the database according to knowledge point tags to obtain the tag model database; retrieval and push: uploading fine art work image samples to the trained tag model database, then extracting knowledge point tags of the fine art work image samples, retrieving associated fine art works, and then pushing the associated fine art works; real-time updating: recording knowledge point tags of input fine art work image samples by the tag model database in real time, and establishing a common tag and a model, and subsequently increasingly pushing contents relevant to the common tag; and generating a user portrait.

8 Claims, 7 Drawing Sheets

Input a training object

RETRIEVAL AND PUSH METHOD BASED ON FINE ART IMAGE TAG, AND USE THEREOF

CROSS REFERENCE TO RELATED APPLICATION

This patent application claims the benefit and priority of Chinese Patent Application No. 202211531991.7, filed with the China National Intellectual Property Administration on Dec. 1, 2022, the disclosure of which is incorporated by reference herein in its entirety as part of the present application.

TECHNICAL FIELD

The present disclosure relates to an image identification and information push technique, and in particular, to a retrieval and push method based on a fine art image tag and use thereof.

BACKGROUND

With the continuous improvement of people's living standard, people have increasing requirements on their own quality. An increasing number of people have focused on training of their own talents and skills. With the spread of quality-oriented education, an increasing number of students have devoted themselves to fine art learning. Fine arts, as a practical art, are immensely popular. To carry out targeted learning, relevant fine art works often need to be retrieved in the course of fine art learning. In addition, there are needs for retrieval of highly accurate fine art images in the specialty of fine arts and the design specialty related to the specialty of fine arts. For example, when students conduct visual studies, train artificial intelligence fine art images, and so on, they need to collect a large number of images based on a specific field in fine art image semantics. However, existing retrieval manners for images are extensive, and there is still no retrieval manner specially based on fine art images in the market. Therefore, existing retrieval manners and image retrieval tools cannot meet such highly specialized work needs and bring about great troubles for existing fine art workers, and researchers and even organizations in the specialty of fine arts and the design specialty thereof as well as the field of artificial intelligence vision.

Existing Retrieval Methods:

By such methods, search is generally performed based on related words, text description, and key words. These methods have limitations and are not suitable for visual and highly specialized subjects and study, such as fine art images. Although image recognition functions such as Taobao and Baidu have emerged at present, such functions are restricted to recommendation based on similarity. For example, if an image of an article is taken to search for the article, only one article or a highly similar article can be pushed. Such images are also not suitable for visual and highly specialized subjects and study, such as fine art images.

Push Methods of Existing Common Software:

For example, Tiktok may realize personalized content reading according to big data computing, and data is collected by labeling users and labeling contents (e.g., (1) personal data; (2) records of keyword searches; (3) videos of categories that are frequently browsed; (4) like video data, comment data, relationship circles of contacts, etc.). Although such methods are capable of pushing contents according to user preferences to a large extent, these methods have defects to a certain extent in the field of professional disciplines such as fine art exams. The method only capable of pushing contents according to user preferences and tags is too extensive, and is incapable of accurately pushing contents for specific problems existing on a user image and knowledge point tags visually conveyed by images and also incapable of associating with the knowledge point tags related to the problems on the image and learning materials. It is hard to perform analysis and accurate pushing for semantic scenes of particular disciplines.

SUMMARY

In view of the problems of the existing retrieval manners and personalized content pushing manners being incapable of meeting the requirements of fine art education and adapting to the course of fine art learning by students, the present disclosure, oriented to important links (fine art exams, teaching, image retrieval, and knowledge learning and consolidation) in fine art education based on techniques such as artificial intelligence, deep learning, reinforcement learning, and big data, provides a convenient and efficient fine art knowledge point tag pushing and retrieval service for fine art learners, provides a method for visual data learning by students for fine art education institutions, and provides a novel fine art image retrieval and push mechanism for fine art education and training software.

To achieve the above objective, the present disclosure provides a retrieval and push method based on a fine art image tag, including the following steps:

S1, establishment of a tag model database
training different tag contents with training samples of different subjects and different categories, and categorizing the training samples in a database according to knowledge point tags to obtain the tag model database;

S2, retrieval and push
retrieval: uploading fine art work image samples to the trained tag model database, then extracting knowledge point tags of the fine art work image samples, retrieving associated fine art works, and then separately determining the fine art work image samples according to the extracted knowledge point tags of the fine art work image samples; and
push: pushing associated fine art works according to the fine art work image samples uploaded by a user and tag data of retrieved images;

S3, real-time updating
recording knowledge point tags of input fine art work image samples by the tag model database in real time, and establishing a common tag and a model according to the fine art work image samples uploaded for a plurality of times, subsequently increasingly pushing contents relevant to the common tag, and updating pushed contents according to fine art work images uploaded by the user in real time, where in the process, if the user subsequently uploads a new image of other category unrelated to an original image subject, a new model is established based on the new image and a subject of the new image; and S4, generation of a user portrait
after use by the user for a period of time, synthetically analyzing the fine art work image samples uploaded by the user and the tag data of the retrieved images to generate the user portrait.

Preferably, step S1 specifically includes the following steps:
firstly, creating a training data set by collecting a certain amount of fine art work images and annotating for knowledge point tags of the fine art work images, and then performing self-supervised training to obtain a learning-enabled image annotation system;

meanwhile, training unannotated fine art work images input continuously and annotated images in the database by semi-supervised learning in consideration of impossible manual annotating for a great number of images, where by semi-supervised learning, the input unannotated fine art work images are predicted and annotated continuously to form dummy tags which are incorporated into the training data set for continuous learning to enhance the robustness of the system; and a new training database is as follows:

$$D=\{(x_1,y_1), \ldots ,(x_1,y_1),x_{1+1}, \ldots ,x_m\}$$

wherein $(x_1, y_1) \ldots (x_1, y_1)$ refer to series of annotated images $(x_1 \ldots xl)$ and their corresponding annotations $(y_1 \ldots y_1)$, and $x_{1+1}, \ldots x_m$ corresponds to unannotated images in the tag model database, wherein m represents a total number of images, l represents number of annotated images in the tag model database, and (m–l) represents unannotated images out of the total number of images in the tag model database.

Preferably, the knowledge point tags in step S2 comprise intuitive knowledge and indirect knowledge;
the intuitive knowledge includes subject information knowledge, article information knowledge, dominant hue knowledge, color cold-warm relationship knowledge, black-white-grey relationship knowledge, spatial knowledge, technique knowledge, depiction degree Knowledge, object dynamic knowledge, character feature knowledge, ratio knowledge of the five sense organs, body block surface knowledge, structural perspective knowledge, level relationship knowledge, and drawing paper wear directly read from the fine art work image samples; and
the indirect knowledge includes text knowledge and video knowledge.

Preferably, extracting article information knowledge in step S2 includes the following steps: firstly, training a convolutional neural network (CNN), then inputting a sample of a fine art work image, identifying a content of the fine art work image using a depthwise separable convolutional neural network, and extracting articles of different forms, followed by tagging the articles in the fine art work image using a SoftMax classifier, and attaching a disciplinary attribute tag to the articles involved in the fine art work image sample using a multi-head attention mechanism; and
when the sample of a fine art work image is a still-life sketch, the following steps are performed:
firstly, performing sketched still-life object detection on an input training sample, training a yolov5 network model through still-life detection of the sketch image and with tag data, then performing mask prediction at a Neck network of the yolov5 network model by means of a PANET structure, performing optimization using GOU_Loss as an objective function for sketched still-life detection to obtain an optimal yolov5 still-life detection model for sketch images, and finally outputting a predicted still-life category and predicted still-life region information by means of non-maximum suppression processing, and performing clipping and outputting according to coordinates of a still-life region; after the completion of training, for an input sample, performing prediction by loading parameters of the optimal yolov5 still-life detection model for sketch images to obtain the predicted still-life category, and clipping the input sketch image according to the coordinates of the still-life region, and outputting each still-life image in the sample sketch image and the disciplinary attribute tag;
where the objective function of GIOU_Loss is as follows:

$$IoU = \frac{(A \cap B)}{A \cup B}$$

$$GIoU = IoU - \frac{C - (A \cup B)}{C}$$

$$\mathcal{L}_{GIoU} = 1 - GIoU$$

where A and B represent areas of two predicted intersection over union (IOU) boxes, and C represents a minimum area surrounding A and B.

Preferably, extracting black-white-grey relationship knowledge in step S2 specifically includes the following steps:
inputting a fine art work image sample, extracting a brightness relationship from a black-and-white image or a black-and-white image converted from a color image, determining the image as an image of a certain brightness as a whole according to area proportions of different brightness color blocks in the image, namely determining a black-white-grey relationship, and giving a brightness tag and an excellence grade tag; and
when the fine art work image sample is a still-life gouache, the following steps are performed:
firstly, generating a grey image of an input still-life gouache sample using a grey image generation algorithm, obtaining an image grey value I1 by using brightness red, green, and blue (RGB) components as approximate RGB and added with a chromatic value UV and performing averaging to obtain good grey image quality in terms of perception and structure, where a calculation formula is as follows:

$$Y=(0.299 \times R)+(0.587 \times G)+(0.114 \times B)$$

$$U=(B-Y) \times 0.565$$

$$V=(R-Y) \times 0.713$$

$$UV=U+V$$

$$R1=R \times 0.299$$

$$R2=R \times 0.587$$

$$R3=R \times 0.114$$

$$G1=G \times 0.299$$

$$G2=G \times 0.587$$

$$G3=G \times 0.114$$

$$B1=B \times 0.299$$

$$B2=B \times 0.587$$

$$B3=B \times 0.114$$

$R4=(R1+R2+R3)/3$ $G4=(G1+G2+G3)/3$ $B4=(B1+B2+B3)/3$ $I1=(R4+G4+B4+UV)/4$

END then equally dividing the image into 10 rectangular color blocks, and calculating a main grey level of each color block by a K-means clustering algorithm, clustering pixel grey values of each color block, and minimizing a square sum of distances between the grey levels of pixels in the rectangular color block and grey levels of corresponding cluster centers by:

$$J = \sum_{n=1}^{N}\sum_{k=1}^{K} r_{nk}\|C(n) - u_k\|^2$$

where n represents coordinates of a pixel in a color block; C(n) represents a grey value of the pixel; N represents a number of pixels in each color block; and K represents a preset number of clusters;

then, taking a cluster having the most pixels in the color block as a main grey level cluster according to the clustering algorithm, and taking a corresponding grey value of the cluster center obtained by the algorithm as the main grey level of the color block; and finally, providing a black-white-grey attribute definition for each color block by presetting a threshold, and obtaining a black-white-grey attribute of each color block in accordance with the threshold and according to the calculated main grey level of the color block, calculating a rectangular area proportion of each grey level color block, and taking the black-white-grey attribute of the color block having the largest area as a tag of the still-life gouache sample.

Preferably, extracting color cold-warm relationship knowledge and dominant hue knowledge in step S2 specifically includes the following steps: inputting a fine art work image sample, extracting color blocks from the sample, obtaining a value of a color of each extracted secondary color block according to an RGB color look up table because secondary colors of the color painting are obtained by mixing pigments, then defining a value range according to the values of different colors in the sample, classifying colors having values close to a pure color value as a same hue, and finally, comparing areas of different hues in the sample and taking the hue having the largest area as the dominant hue, thereby determining a specific hue and cold or warm hue of the sample;

when the fine art work image sample is a still-life gouache, the following steps are performed:

firstly, equally dividing the image into 30 rectangular color blocks, and calculating a main RGB color value of each color block by the K-means clustering algorithm, extracting the K-means clustering algorithm of the main RGB, clustering pixel colors of each color block, and minimizing a square sum of distances between the RGB values of pixels in the rectangular color block and the RGB values of corresponding cluster centers by:

$$J = \sum_{n=1}^{N}\sum_{k=1}^{K} r_{nk}\|C(n) - u_k\|^2$$

where n represents coordinates of a pixel in a color block; C(n) represents an RGB value of the pixel; N represents a number of pixels in each color block; and K represents a preset number of clusters;

then, taking a cluster having the most pixels in the color block as a dominant hue cluster according to the clustering algorithm, and taking a corresponding RGB value of the cluster center obtained by the algorithm as the main RGB value of the color block; and finally, providing a hue and cold-warm attribute definition for each color block by presetting a threshold, and obtaining a dominant hue of each color block in accordance with the threshold and according to the calculated main RGB value of the color block, calculating a rectangular area proportion of each hue color block, taking a hue attribute of the color block having the largest area as a dominant hue tag of the still-life gouache sample, and giving the cold or warm hue tag of the sample according to the cold-warm hue definition.

Preferably, extracting spatial knowledge in step S2 specifically includes the following steps:

inputting a fine art work image sample, extracting and comparing the brightness of the blackest portion and the brightness of the whitest portion of a central region of the sample to obtain a value of a contrast, meanwhile, extracting and comparing the brightness of the blackest portion and the brightness of the whitest portion of a surrounding fuzzy region of the sample to obtain a value of another contrast, comparing the two contrasts, and determining that the space sense is weak if a difference of the two contrasts is less than a set value, otherwise determining that the space sense is strong;

when the fine art work image sample is a still-life sketch, the following steps are performed:

firstly, equally dividing the input image sample into 36 image regions, and taking an annular central region and a main-body central region as a central region and a surrounding region as a fuzzy region, thereby analyzing the 36 image regions as central regions and fuzzy regions, respectively;

secondly, clustering grey values or RGB values of each image region, taking the problem of extracting a brightness degree of each region as two types of clustering problems and clustering by the K-means clustering algorithm; clustering pixel colors of each region by the K-means clustering algorithm, and minimizing a square sum of distances between the grey values or RGB values of pixels in each region and the grey values or RGB values of corresponding cluster centers by:

$$J = \sum_{n=1}^{N}\sum_{k=1}^{K} r_{nk}\|C(n) - u_k\|^2$$

where n represents coordinates of a pixel in each region; C(n) represents a grey value or RGB value of the pixel; N represents a number of pixels in each region; and K represents a preset number of clusters, K being 2;

then, taking the corresponding grey values or RGB values of two types of cluster centers obtained by the algorithm as a main brightness value and a darkness value of the color block, respectively; and finally, obtaining differences of the main brightness values and the main darkness values of the central region and the fuzzy region, respectively, to obtain main light and shade contrasts of the two regions, then calculating a difference between the main light and shade contrasts of the central region and the fuzzy region, and obtaining a light and shade contrast difference feature of the two regions by threshold binarization; if the difference between the main light and shade contrasts is greater than a threshold, tagging the work with strong space sense; and if the difference is less than the threshold, tagging the work with weak space sense.

Preferably, extracting technique knowledge in step S2 specifically includes the following steps:

inputting a fine art work image sample, delimiting a position of a main object in the sample, extracting an area range of the main object, extracting a highlight of the main object, determining brush strokes of the sample based on techniques entered in the database, and determining the drawing as good if the brush strokes or the line arrangement are/is clear, tough, and definite, otherwise, as bad; and when the fine art work image sample is a still-life sketch or a still-life color painting, the following steps are performed:

firstly, establishing a brush stroke classification database with shape images of brush strokes and brush stroke category tags based on training samples, and establishing a line arrangement classification database with shape images of different line arrangement methods and line arrangement category tags; then inputting samples to a multi-branch integrated CNN for training, and optimizing a cross-entropy loss function to obtain optimal brush stroke identification and line arrangement identification models, where the cross-entropy loss function is as follows:

$$L=-y \log \hat{y}+(1-y)\log(1-\hat{y})$$

secondly, detecting a central region of the main object of the input sample image to obtain an approximate region of each object in the image; and finally, obtaining brightest and darkest coordinate points in the image by the K-means clustering method, extracting a brightest image region, identifying a brush stroke category or a line arrangement category of the image region by the trained multi-branch integrated CNN, and taking the identified image region as clear brush stroke/line arrangement and unidentified image region as unclear brush stroke/line arrangement.

Preferably, extracting text knowledge in step S2 specifically includes the following steps:

firstly, performing text target detection on an input image by a trained connectionist text proposal network (CTPN) model, where the network is densely slid in the last convolution mapping of a VGG16 model by a 3*3 space window; sequential windows of each row are connected by a bidirectional long short-term memory (LSTM) cycle, where a convolution feature 3*3*C of each window is used as an input to 256D BLSTM, and a recurrent neural network (RNN) layer is connected to a 512D fully connected layer and then to an output layer; text/non-text scores, y-axis coordinates, and offsets of k anchor points are predicted together; the network finally outputs an elaborate text box with a continuously fixed width; and the image is clipped according to a predicted text box to obtain a text region of the image;

secondly, identifying a text in the detected text region by a trained convolutional recurrent neural network-connectionist temporal classification (CRNN-CTC) network, where the network firstly performs downsampling by a CNN to obtain a feature map of the text image, extracting a feature from a sequential code of the feature map by an RNN, mapping the code to a prediction of the image text, and outputting the text information in the image by a feature description layer; and finally, outputting the text information in each region of the sample image as a text knowledge tag of the image.

The present disclosure provides a use of a retrieval and push method based on a fine art image tag in a fine art teaching institution, where the tag model database is a model established based on fine art drawing images uploaded by all students in the fine art teaching institution, and user portraits of all the students are generated to facilitate knowing the learning progress and the learning conditions of all the students such that a teaching program is adjusted and targeted teaching is realized.

Therefore, the present disclosure has the following beneficial effects:

1, the problem that the existing retrieval methods are restricted to searches based on related words, text description, and key words and not suitable for visual and highly specialized subjects (such as fine art images) is solved.

2, the problem that the existing image retrieval functions are restricted to image similarity and can only push highly similar articles when searching based on an image of an article is solved. Thus, when images of fine art subjects are retrieved, an image semantic database can be analyzed and established to accurate locate the knowledge of the discipline field contained in an image, e.g., knowledge such as background knowledge, technique knowledge, comments, and symbol elements. Thus, a student only needs to upload a drawing, and then problems of such a drawing can be located accurately and the relevant knowledge in the discipline field of the drawing can be received. The learning efficiency of students can be improved.

3, the problem that the existing recommendation mechanism is restricted to labeling users and labeling contents and pushing according to user preferences and tags and is not applicable to the field of particular professional disciplines such as fine art exam frames. The present disclosure is capable of database establishment and data modeling for data of fine art frames, and capable of accurately pushing contents for specific problems existing on a user frame and associating with the knowledge point tags related to the problems on the frame and learning materials. The present disclosure permits analysis and accurate push for semantic scenes of particular disciplines and achieves the effects of assisting users with personalized fine art learning and improving the learning efficiency.

4, the current requirements of educational digital transformation and educational informationization are met; the collection of data and the building of information scenes in the course of fine art learning are achieved; digital techniques are utilized and fused; the awareness and thinking of digitization are set; the digital fine art learning capability of students is fostered and digital fine art learning methods are developed; and smart fine art education is established.

The present disclosure complies with the current requirements of educational digital transformation and educational informationization are met; the collection of data and the building of information scenes in the course of fine art learning are achieved; digital techniques are utilized and fused; the awareness and thinking of digitization are set; the digital fine art learning capability of students is fostered and digital fine art learning methods are developed; and smart fine art education is established. A digital governance system and mechanism for fine art education are provided.

The technical solutions of the present disclosure will be further described in detail below with reference to the accompanying drawings and embodiments.

REFERENCE NUMERALS

Figure 6:
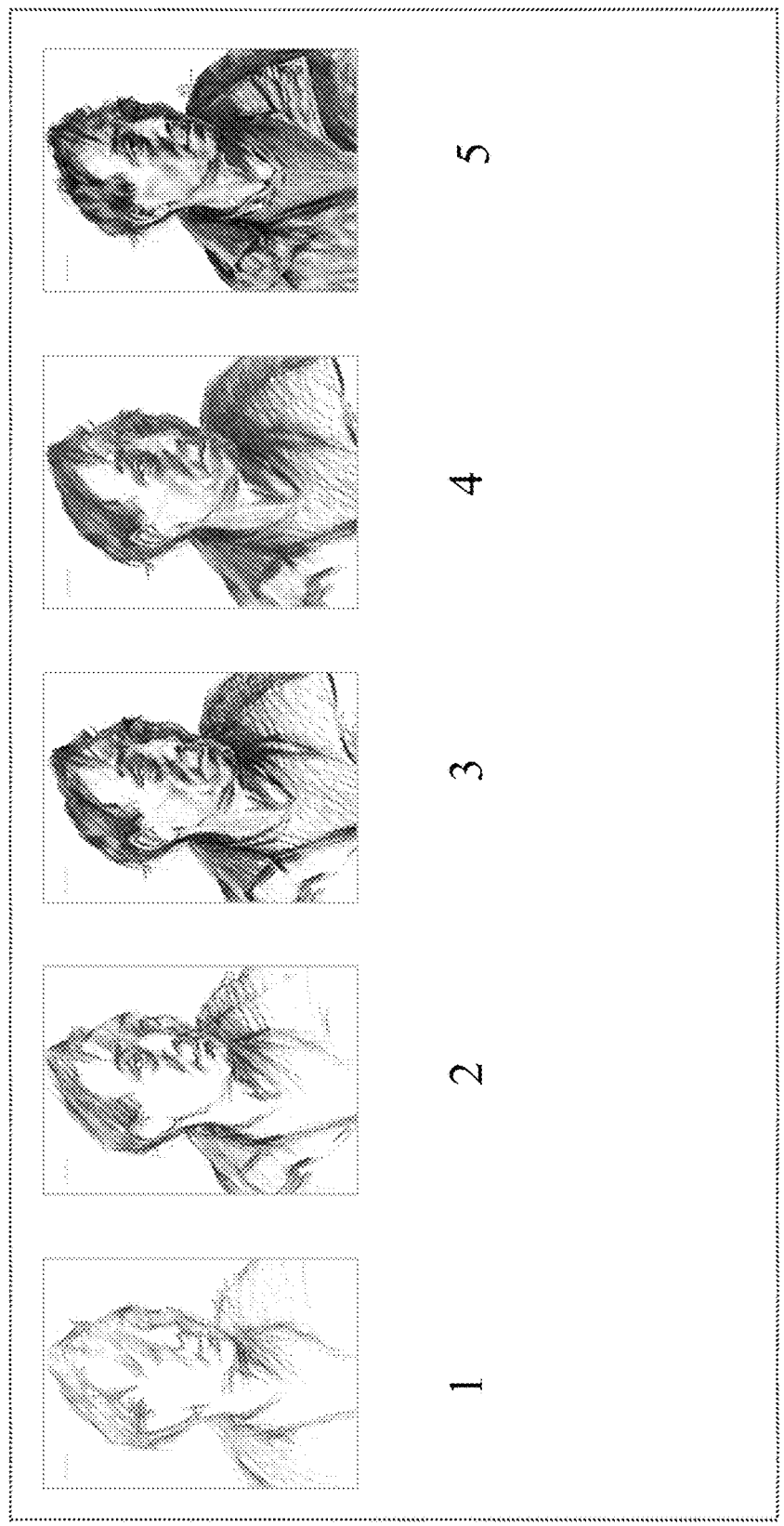
FIG. 6 is a diagram illustrating an extraction process of Example 6 of the present disclosure.

In FIG. 6:
1—Outline sketching stage: Regardless of technique, the first step is always sketching the outline. This outline sketching of this work is conventional. In the first image, the outer outline of the character and the tone of the clothing are sketched. The sketching of the clothing is acceptable because there is no need to sketch the clothing elaborately. In the second image, the positions of the five sense organs and the approximate shape are drawn. The light of the drawing is determined according to the tone of the five sense organs, and the light and shade relationship is expressed. This is a relatively skilled way of drawing. A beginner may draw light and shade border lines, leaving the shade unprocessed to facilitate subsequent adjustment;

2—Light and shade relationship: In the third image, the specific shapes of the five organ senses are detailed, and meanwhile, the light and shade relationship of the drawing strengthened. By this step, we can determine the dark face level of the face of the character and the area of the bright face. At this time, the eyes may be narrowed to watch the work, the adjustment may be made to the work immediately. In the fourth image, the brush strokes are strong, the tones are well expressed, and the grey face is strengthened slightly while the bright face is still not processed. Here, it needs to be noted by students that regardless of the position of the tone, the tones should serve the shape. It is necessary to know the importance of the tones, and it is ok as long as it is drawn to black;

3—In-depth adjustment: It is obvious that the fifth image has been erased once. Some students may ask why erasing is made to such a good drawing? Actually, erasing the tone is to make the tone fitter and softer. If a drawing has only lines, the drawing is very tough. By erasing the tone, the grey face levels are richer, laying the foundation for the final shaping. The last image is the work after erasing. The details of the five sense organs, hair, face, neck and clothing are completed rapidly at this step. The grey tone of the whole drawing is rich. The deep color and the bright color are separated; the light sense is strong; the shape is full; and the details are rich. This is a perfect work!

4—Rethinking and observation: Finally, let us see the details. The light source of this work is special, which makes the tone of the face heavy. The bright face is concentrated on the parts from the eye to the ear and the forehead. Although the tone of the shade is heavy, the details needing to be drawn in the shade are drawn. The shape of the eye can be seen faintly and the volume sense is reflected sufficiently. Many students may not draw the details or draw less details in the shade. This is wrong. If the shape in the shade has no volume sense, the overall effect of the drawing will be affected. It is suggested that students draw the shape and details needing to be drawn in the shade first before adding color such that the drawing is complete. Secondly, as can be seen from the drawing steps, the bright face and the grey face are drawn at last, and even some place is not drawn. On the one hand, the light sense is considered. On the other hand, there is no need to sufficiently draw the bright face and the grey face, and the light and shade border lines, the five sense organs, and the structural portions should be focused.

Figure 7:
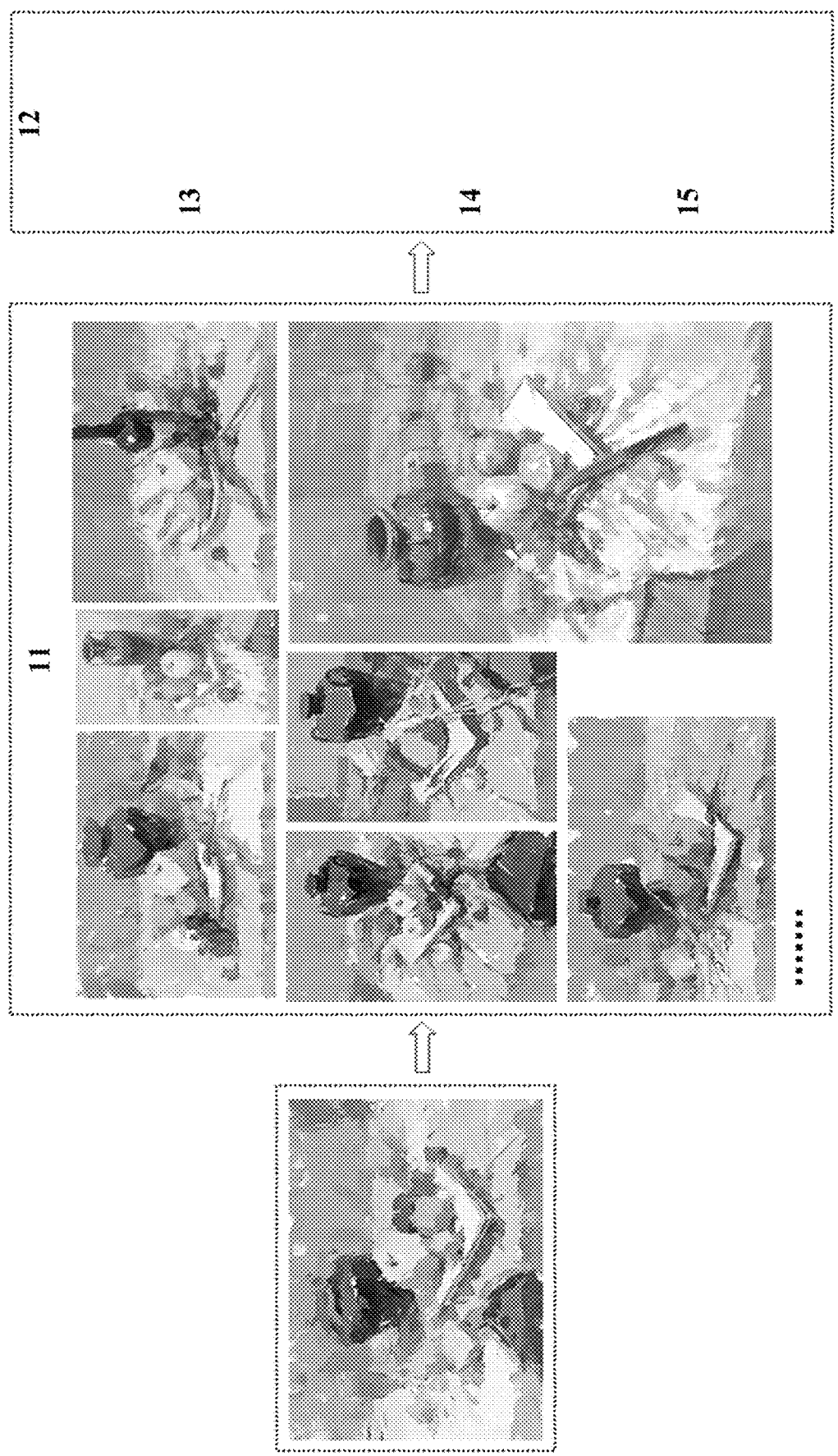
FIG. 7 is a diagram illustrating an extraction process of Example 7 of the present disclosure.

In FIG. 7:
11—Visual knowledge
12—Indirect knowledge
13—Color volume: The color volume is main expressed by brush strokes and color. The sketch relationship is emphasized again; both of light and shade border lines should be drawn, and light reflections and highlights should not be forgotten. Colors should be drawn by the thinking way of sketch. Regardless of size, any object has a volume. A large jar has a volume, and a small pen has a volume . . . .

14—Inherent color: Inherent color is the inevitable requirement of color. The color may be adjusted appropriately, but it is forbitten to go against the basic elements of an object. As a matter of course, when the inherent color is mentioned, environmental color must be mentioned. Now, there is a red apple on a blue cloth, and there is a warm light source on the side top . . . .

15—Fuzzy and clear relationship: Fuzzy and clear are important factors making a drawing vivid. Clear may be expressed definitely using a brush, which may be a full and thick pigment, a color with high purity, and solid detail creation. Fuzzy may be expressed by drawing rapidly using a dry brush, by using a thinned pigment, by using a color with low purity, or by an outlining way.

DETAILED DESCRIPTION OF THE EMBODIMENTS

The present disclosure will be further described below with the accompanying drawings. It should be noted that the embodiments are implemented on the premise of the technical solution and provide the detailed implementations and specific operation processes, but the protection scope of the present disclosure is not limited to the following embodiments.

The present disclosure includes the following steps:

S1, Establishment of a Tag Model Database

Different tag contents are trained with training samples of different subjects and different categories, and the training samples in the database are categorized according to knowledge point tags to obtain the tag model database.

Preferably, step S1 specifically include the following steps:

firstly, create a training data set by collecting a certain amount of fine art work images and annotate for knowledge point tags of the fine art work images, and then perform self-supervised training to obtain a learning-enabled image annotation system;

meanwhile, train unannotated fine art work images input continuously and annotated images in the database by semi-supervised learning in consideration of impossible manual annotating for a great number of images, where by semi-supervised learning, the input unannotated fine art work images are predicted and annotated continuously to form dummy tags which are incorporated into the training data set for continuous learning to enhance the robustness of the system; and a new training database is as follows:

$$D=\{(x_1,y_1), \ldots ,(x_1,y_1),x_{l+1}, \ldots ,x_m\}$$

where one sample is annotated, and (m−1) samples are unannotated.

It needs to be noted that if a plurality of sketch images are input, the system will form a plurality of tag category databases according to a plurality of tags extracted from the sketch images, and a plurality of tag databases are established to form the database of the whole system. The tag databases are associated with one another so as to be called conveniently. When there are already a large number of different knowledge points and tag contents in the database, a single data model can be established with a single image.

S2, Retrieval and Push

Retrieval: fine art work image samples are uploaded to the trained tag model database; knowledge point tags of the fine art work image samples are then extracted; associated fine art works are retrieved; and then the fine art work image samples are separately determined according to the extracted knowledge point tags of the fine art work image samples.

Push: associated fine art works are pushed according to the fine art work image samples uploaded by a user and tag data of retrieved images.

Preferably, the knowledge point tags in step S2 include intuitive knowledge and indirect knowledge.

The intuitive knowledge includes subject information knowledge, article information knowledge, dominant hue knowledge, color cold-warm relationship knowledge, black-white-grey relationship knowledge, spatial knowledge, technique knowledge, depiction degree Knowledge, object dynamic knowledge, character feature knowledge, ratio knowledge of the five sense organs, body block surface knowledge, structural perspective knowledge, level relationship knowledge, and drawing paper wear directly read from the fine art work image samples. That is, the intuitive knowledge refers to relevant knowledge information based on which a fine art work image can be directly determined as good.

The indirect knowledge includes text knowledge and video knowledge. For example, the indirect knowledge may be knowledge indirectly obtained according to the text of an image or a video, such as subject knowledge, technique knowledge (text), drawing process knowledge, text annotation knowledge, process explanation knowledge, score knowledge, and drawing problem knowledge. That is, the indirect knowledge refers to relevant knowledge information based on which a fine art work image can be hardly determined.

It needs to be noted that the scope is hard to define due to the particularity and the perceptual feature of a fine art work. Therefore, the range of the knowledge in the present embodiment is limited to the field of united examination of fine arts, and the knowledge is extracted in accordance with scores in united examination of fine arts and teaching norms as well as conventions, which shall not be construed as limitations to the present disclosure.

Preferably, extracting article information knowledge in step S2 includes the following steps: firstly, train a convolutional neural network (CNN), then input a sample of a fine art work image, identify a content of the fine art work image using a depthwise separable convolutional neural network, extract articles of different forms, then tag the articles in the fine art work image (e.g., "duck") using a SoftMax classifier, and attach a disciplinary attribute tag (e.g., "still-life sketch—duck") to the articles involved in the fine art work image sample using a multi-head attention mechanism.

In a similar fashion, if a hasty sketch image is input, character information is extracted, e.g., tags such as "middle-aged man", "elderly woman", and "young woman". If a color head portrait image is input, character head portrait information is extracted, such as "head portrait of middle-aged woman" and "head portrait of young man".

It needs to be noted that the article and character knowledge is not limited to a single tag. For example, the tag "middle-aged man" is attached after the extraction of the information from the hasty sketch image, and not limited to such a tag, other tags may also be attached, such as "standing middle-aged man" and "middle-aged man holding an article in hand". Such tags are attached according to the number and contents of the training samples. Continuous training and classification are performed by the CNN. The more the samples, the more common regularities of extraction and the more of tags in a same image.

Moreover, the still-life sketch is taken as an example here. The method is also suitable for fine art images of subjects such as still-life color painting, color head portrait, sketched head portrait, and hasty sketch.

It needs to be noted that the article and character knowledge is not limited to a single tag. For example, the tag "middle-aged man" is attached after the extraction of the information from the hasty sketch image, and not limited to such a tag, other tags may also be attached, such as "standing middle-aged man" and "middle-aged man holding an article in hand". Such tags are attached according to the number and contents of the training samples. Continuous training and classification are performed by the CNN. The more the samples, the more common regularities of extraction and the more of tags in a same image.

Figure 1:
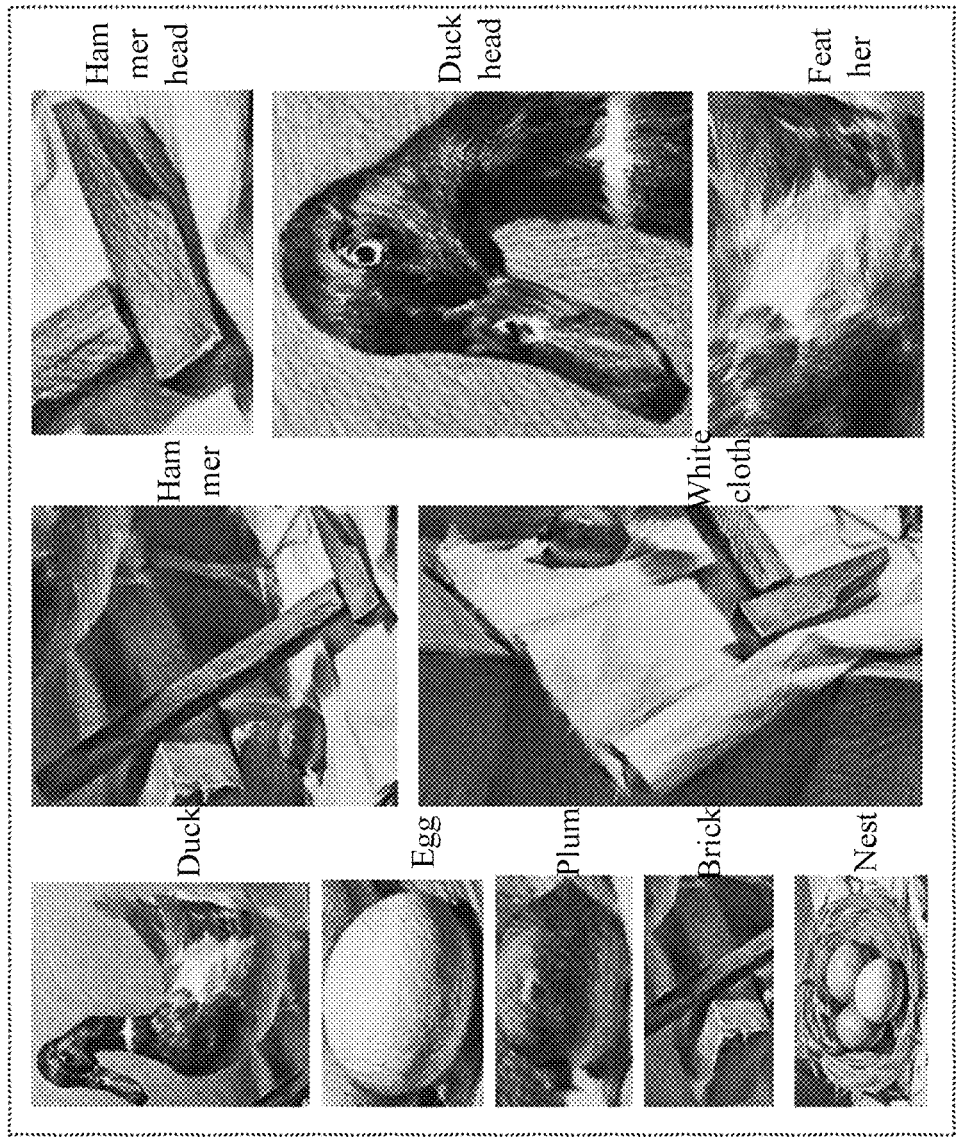
FIG. 1 is a diagram illustrating an extraction process of Example 1 of the present disclosure.
Figure 1:
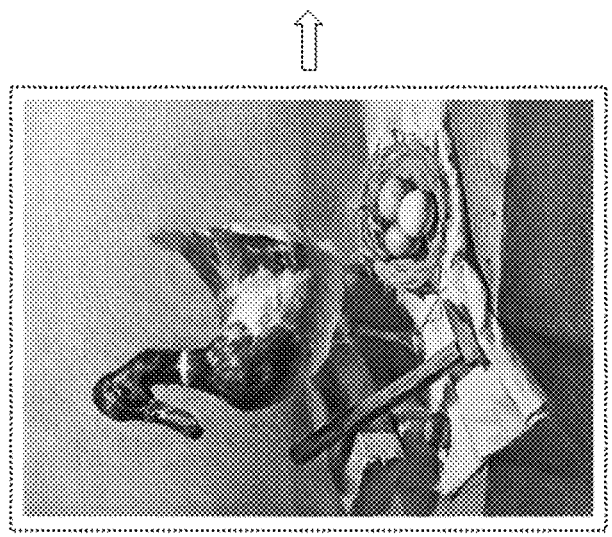

FIG. 1 is a diagram illustrating an extraction process of Example 1 of the present disclosure. As shown in FIG. 1, Example 1: when the fine art work image sample is a still-life sketch, the following steps are performed:

firstly, perform sketched still-life object detection on an input training sample, train a yolov5 network model through still-life detection of the sketch image and with tag data, then perform mask prediction at a Neck network of the yolov5 network model by means of a PANET structure, perform optimization using GOU_Loss as an objective function for sketched still-life detection to obtain an optimal yolov5 still-life detection model for sketch images, and finally output a predicted still-life category and predicted still-life region information by means of non-maximum suppression processing, and perform clipping and outputting according to coordinates of a still-life region; after the completion of training, for an input sample, perform prediction by loading parameters of the optimal yolov5 still-life detection model for sketch images to obtain the predicted still-life category, and clip the input sketch image according to the coordinates of the still-life region, and output each still-life image in the sample sketch image and the disciplinary attribute tag;

where the objective function of GIOU_Loss is as follows:

$$IoU = \frac{(A \cap B)}{A \cup B}$$

$$GIoU = IoU - \frac{C - (A \cup B)}{C}$$

$$\mathcal{L}_{GIoU} = 1 - GIoU$$

where A and B represent areas of two predicted intersection over union (IOU) boxes, and C represents a minimum area surrounding A and B.

Preferably, extracting black-white-grey relationship knowledge in step S2 specifically includes the following steps:

input a fine art work image sample, extract a brightness relationship from a black-and-white image or a black-and-white image converted from a color image, determine the image as an image of a certain brightness as a whole according to area proportions of different brightness color blocks in the image, namely determine a black-white-grey relationship, and give a brightness tag and an excellence grade tag. It needs to be noted that the black-white-grey relationship is not limited to sketch and hasty sketch images, and color images also have black-white-grey attributes thereof. The black-white-grey relationship of colors is a brightness relationship of colors.

Figure 2:
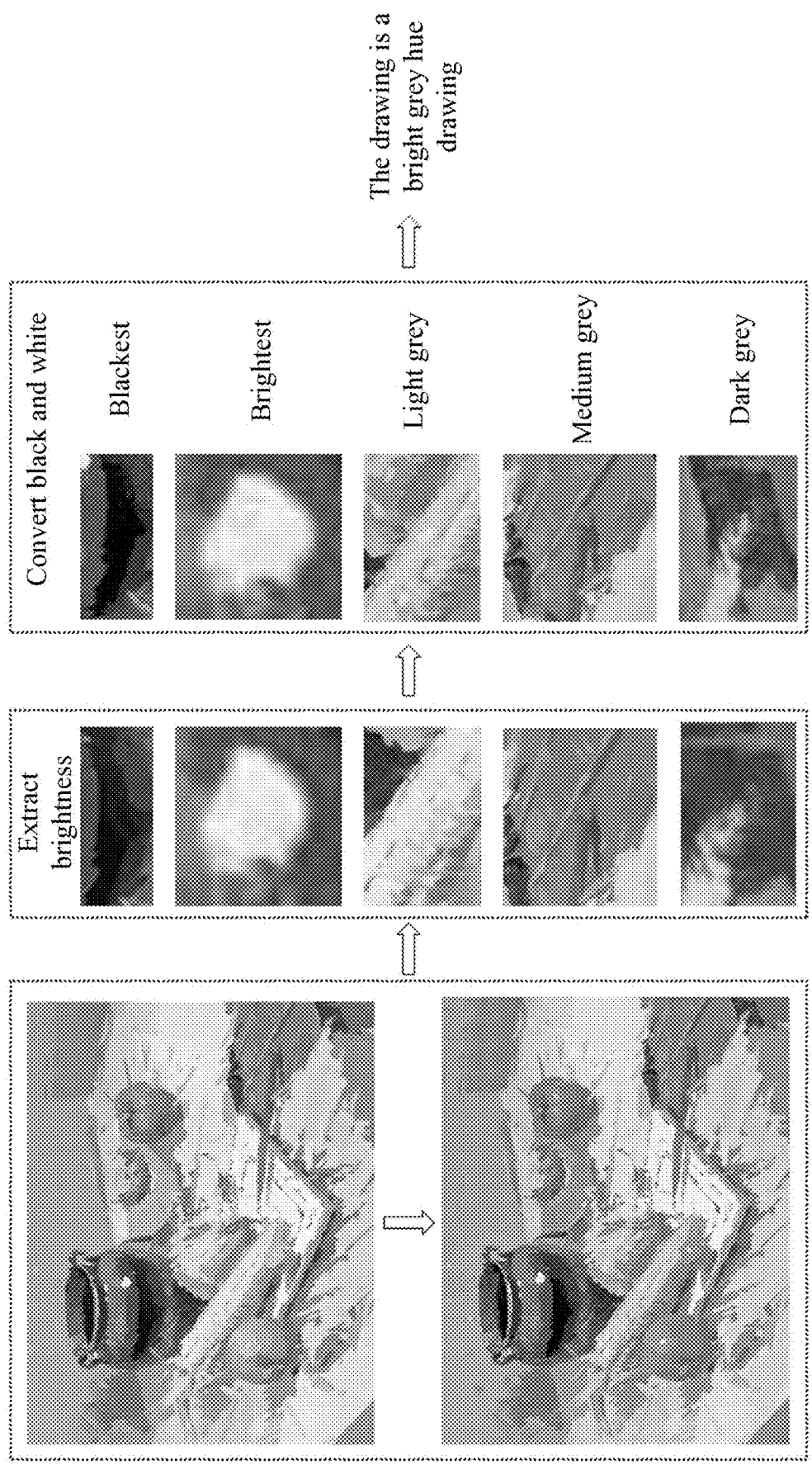
FIG. 2 is a diagram illustrating an extraction process of Example 2 of the present disclosure.

FIG. 2 is a diagram illustrating an extraction process of Example 2 of the present disclosure. As shown in FIG. 2, Example 2: when the fine art work image sample is a still-life gouache, the following steps are performed:

firstly, generate a grey image of an input still-life gouache sample using a grey image generation algorithm, obtain an image grey value I1 by using brightness red, green, and blue (RGB) components as approximate RGB and added with a chromatic value UV and perform averaging to obtain good grey image quality in terms of perception and structure, where a calculation formula is as follows:

$Y=(0.299 \times R)+(0.587 \times G)+(0.114 \times B)$ $U=(B-Y) \times 0.565$ $V=(R-Y) \times 0.713$ $UV=U+V$ $R1=R \times 0.299$ $R2=R \times 0.587$ $R3=R \times 0.114$ $G1=G \times 0.299$ $G2=G \times 0.587$ $G3=G \times 0.114$ $B1=B \times 0.299$ $B2=B \times 0.587$ $B3=B \times 0.114$ $R4=(R1+R2+R3)/3$ $G4=(G1+G2+G3)/3$ $B4=(B1+B2+B3)/3$ $I1=(R4+G4+B4+UV)/4$

END then equally divide the image into 10 rectangular color blocks, and calculate a main grey level of each color block by a K-means clustering algorithm, then extract the K-means clustering algorithm of the main grey level, cluster pixel grey values of each color block, and minimize a square sum of distances between the grey levels of pixels in the rectangular color block and grey levels of corresponding cluster centers by:

$$J = \sum_{n=1}^{N} \sum_{k=1}^{K} r_{nk} \| C(n) - u_k \|^2$$

where n represents coordinates of a pixel in a color block; C(n) represents a grey value of the pixel; N represents a number of pixels in each color block; and K represents a preset number of clusters;

then, take a cluster having the most pixels in the color block as a main grey level cluster according to the clustering algorithm, and take a corresponding grey value of the cluster center obtained by the algorithm as the main grey level of the color block; and finally, provide a black-white-grey attribute definition for each color block by presetting a threshold, and obtain a black-white-grey attribute of each color block in accordance with the threshold and according to the calculated main grey level of the color block, calculate a rectangular area proportion of each grey level color block, and take the black-white-grey attribute of the color block having the largest area as a tag of the still-life gouache sample.

Preferably, extracting color cold-warm relationship knowledge and dominant hue knowledge in step S2 specifically includes the following steps: input a fine art work image sample, extract color blocks from the sample, obtain a value of a color of each extracted secondary color block according to an RGB color look up table because secondary colors of the color painting are obtained by mixing pigments, then define a value range according to the values of different colors in the sample, classify colors having values close to a pure color value as a same hue, and finally, compare areas of different hues in the sample and take the hue having the largest area as the dominant hue, thereby determining a specific hue and cold or warm hue of the sample.

Cold and warm colors refer to cold and hot feelings in color psychology. Colors such as red, orange, yellow, and brown often make people feel hot, excited, enthusiastic, and warm, and thus are referred to as warm colors. Colors such as green, blue, and purple often make people feel calm, cool, open, and transparent, and thus are referred to as cold colors. Black, white, and grey are neutral colors. Each color work for united examinations of fine arts needs to have the color cold-warm relationship and dominant hue awareness.

It needs to be noted that the intuitive knowledge here is mainly applicable to color images of types such as gouache and watercolor.

Figure 3:
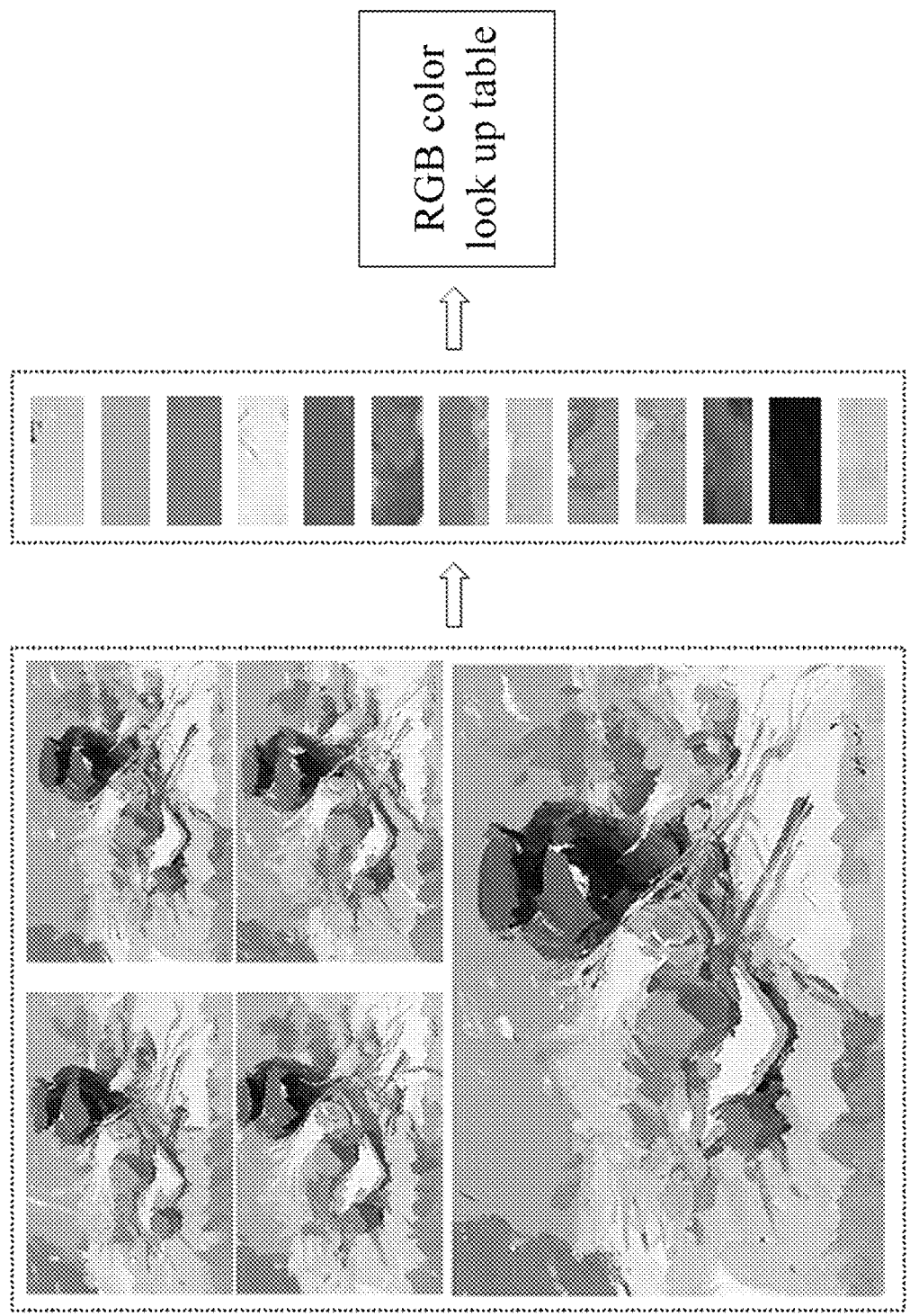
FIG. 3 is a diagram illustrating an extraction process of Example 3 of the present disclosure.

FIG. 3 is a diagram illustrating an extraction process of Example 3 of the present disclosure. As shown in FIG. 3, Example 3: when the fine art work image sample is a still-life gouache, the following steps are performed:

firstly, equally divide the image into 30 rectangular color blocks, and calculate a main RGB color value of each color block by the K-means clustering algorithm, extract the K-means clustering algorithm of the main RGB, cluster pixel colors of each color block, and minimize a square sum of distances between the RGB values of pixels in the rectangular color block and the RGB values of corresponding cluster centers by:

$$J = \sum_{n=1}^{N}\sum_{k=1}^{K} r_{nk} \|C(n) - u_k\|^2$$

where n represents coordinates of a pixel in a color block; C(n) represents an RGB value of the pixel; N represents a number of pixels in each color block; and K represents a preset number of clusters;

then, take a cluster having the most pixels in the color block as a dominant hue cluster according to the clustering algorithm, and take a corresponding RGB value of the cluster center obtained by the algorithm as the main RGB value of the color block; and finally, provide a hue and cold-warm attribute definition for each color block by presetting a threshold, and obtain a dominant hue of each color block in accordance with the threshold and according to the calculated main RGB value of the color block, calculate a rectangular area proportion of each hue color block, take a hue attribute of the color block having the largest area as a dominant hue tag of the still-life gouache sample, and give the cold or warm hue tag of the sample according to the cold-warm hue definition.

Preferably, extracting spatial knowledge in step S2 specifically includes the following steps:

input a fine art work image sample, extract and comparing the brightness of the blackest portion and the brightness of the whitest portion of a central region of the sample to obtain a value of a contrast, meanwhile, extract and compare the brightness of the blackest portion and the brightness of the whitest portion of a surrounding fuzzy region of the sample to obtain a value of another contrast, compare the two contrasts, and determine that the space sense is weak if a difference of the two contrasts is less than a set value, otherwise determine that the space sense is strong.

Figure 4:
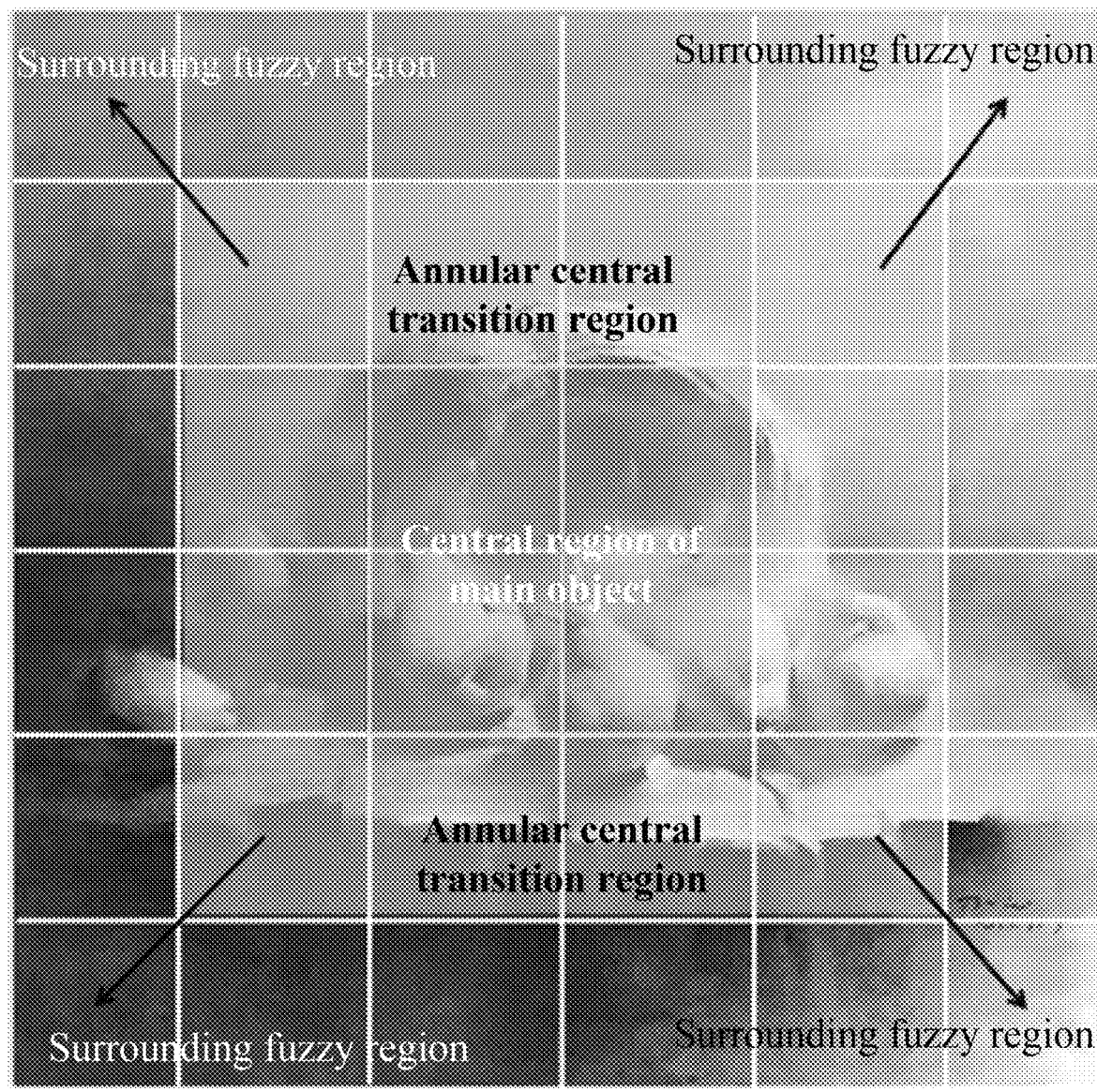
FIG. 4 is a diagram illustrating an extraction process of Example 4 of the present disclosure.

While ordered space sense of a drawing is created, fuzzy and clear expressions are created. The space sense and the fuzzy and clear sense knowledge of the drawing may be reflected according to the following regularities: "clear near view and fuzzy distant view", "clear article focus and fuzzy background", "large near view and small distant view", "clear bright view and fuzzy dark view", and "clear square and fuzzy circle". "Clear" refers to that the drawing is clear and bright. "Fuzzy" refers to the drawing is fuzzy and unclear. As shown in FIG. 4, the central region is the clearest and most definite with the largest brightness contrast. In case of a color work, the central region has the richest hues and color changes. From the central region to the annular central transition region and the surrounding fuzzy regions, the contrast and the sharpness decrease sequentially, reflecting the rhythm sense, the space sense, and the fuzzy and clear layers of the drawing. Based on the drawing characteristics, the system will extract the images of the central region and other regions of a fine art work for comparison in terms of brightness, sharpness, and hue saturation. If the contrast images of different regions are close in brightness, sharpness, and hue saturation changes, the fuzzy and clear relationship of the work is indefinite and the deliberation of the space sense is inadequate.

FIG. 4 is a diagram illustrating an extraction process of Example 4 of the present disclosure. As shown in FIG. 4, Example 4: when the fine art work image sample is a still-life sketch, the following steps are performed:

firstly, equally divide the input image sample into 36 image regions, and take an annular central region and a main-body central region as a central region and a surrounding region as a fuzzy region, thereby analyzing the 36 image regions as central regions and fuzzy regions, respectively;

secondly, cluster grey values or RGB values of each image region, take the problem of extracting a brightness degree of each region as two types of clustering problems and cluster by the K-means clustering algorithm; cluster pixel colors of each region by the K-means clustering algorithm, and minimize a square sum of distances between the grey values or RGB values of pixels in each region and the grey values or RGB values of corresponding cluster centers by:

$$J = \sum_{n=1}^{N}\sum_{k=1}^{K} r_{nk} \|C(n) - u_k\|^2$$

where n represents coordinates of a pixel in each region; C(n) represents a grey value or RGB value of the pixel; N represents a number of pixels in each region; and K represents a preset number of clusters, K being 2;

then, take the corresponding grey values or RGB values of two types of cluster centers obtained by the algorithm as a main brightness value and a darkness value of the color block, respectively; and finally, obtain differences of the main brightness values and the main darkness values of the central region and the fuzzy region, respectively, to obtain main light and shade contrasts of the two regions, then calculate a difference between the main light and shade contrasts of the central region and the fuzzy region, and obtain a light and shade contrast difference feature of the two regions by threshold binarization; if the difference between the main light and shade contrasts is greater than a threshold, tag the work with strong space sense; and if the difference is less than the threshold, tag the work with weak space sense.

Figure 5:
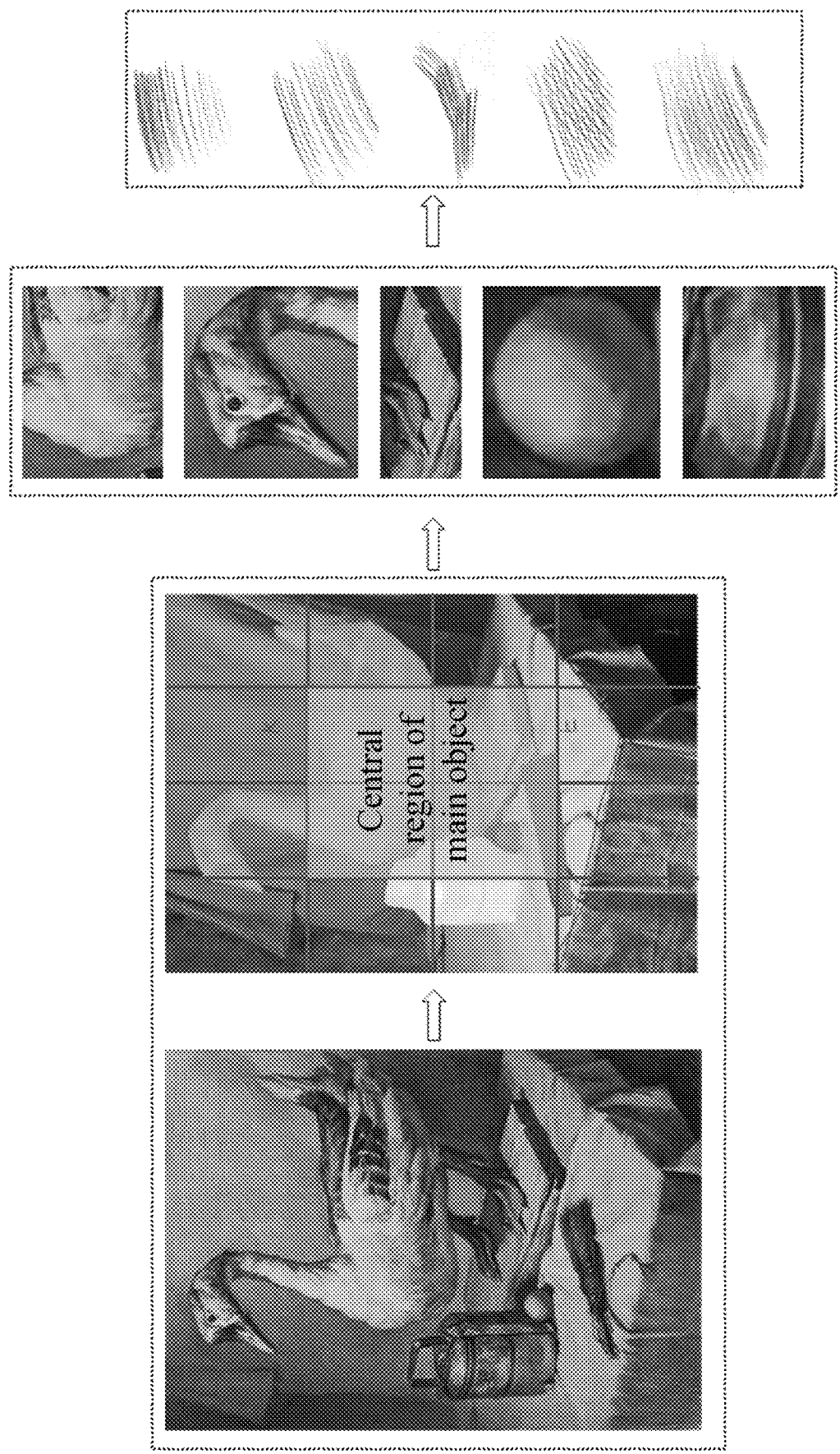
FIG. 5 is a diagram illustrating an extraction process of Example 5 of the present disclosure.

Preferably, extracting technique knowledge in step S2 specifically includes the following steps:

input a fine art work image sample, delimit a position of a main object in the sample, extract an area range of the main object, extract a highlight of the main object, determine brush strokes of the sample based on techniques entered in the database, and determine the drawing as good if the brush strokes or the line arrangement are/is clear, tough, and definite, otherwise, as bad; and FIG. 5 is a diagram illustrating an extraction process of Example 5 of the present disclosure. As shown in FIG. 5, Example 5: when the fine art work image sample is a still-life sketch or a still-life color painting, the following steps are performed:

firstly, establish a brush stroke classification database with shape images of brush strokes and brush stroke category tags based on training samples, and establish a line arrangement classification database with shape images of different line arrangement methods and line arrangement category tags; then input samples to a multi-branch integrated CNN for training, and optimize a cross-entropy loss function to obtain optimal brush stroke identification and line arrangement identification models, where the cross-entropy loss function is as follows:

$$L = -y \log \hat{y} + (1-y)\log(1-\hat{y})$$

secondly, detect a central region of the main object of the input sample image to obtain an approximate region of each object in the image; and finally, obtain brightest and darkest coordinate points in the image by the K-means clustering method, extract a brightest image region, identify a brush stroke category or a line arrangement category of the image region by the trained multi-branch integrated CNN, and take the identified image region as clear brush stroke/line arrangement and unidentified image region as unclear brush stroke/line arrangement.

It needs to be noted that the present embodiment is illustrated only by taking the above 5 kinds of intuitive knowledge for example, but the intuitive knowledge is not limited thereto. The development idea of the present disclosure is to design a rational and logical methodology for machine training with the abstract visual sense knowledge and fine art aesthetic information conveyed by images and summarized perceptual experience of human in drawing, and such methods allow for perception by a machine, facilitating subsequent knowledge point association and push.

FIG. 6 is a diagram illustrating an extraction process of Example 6 of the present disclosure. As shown in FIG. 6, Example 6: preferably, extracting text knowledge in step S2 specifically includes the following steps:

firstly, perform text target detection on an input image by a trained connectionist text proposal network (CTPN) model, where the network is densely slid in the last convolution mapping of a VGG16 model by a 3*3 space window; sequential windows of each row are connected by a bidirectional long short-term memory (LSTM) cycle, where a convolution feature 3*3*C of each window is used as an input to 256D BLSTM, and a recurrent neural network (RNN) layer is connected to a 512D fully connected layer and then to an output layer; text/non-text scores, y-axis coordinates, and offsets of k anchor points are predicted together; the network finally outputs an elaborate text box with a continuously fixed width; and the image is clipped according to a predicted text box to obtain a text region of the image;

secondly, identify a text in the detected text region by a trained convolutional recurrent neural network-connectionist temporal classification (CRNN-CTC) network, where the network firstly performs downsampling by a CNN to obtain a feature map of the text image, extracting a feature from a sequential code of the feature map by an RNN, mapping the code to a prediction of the image text, and outputting the text information in the image by a feature description layer; and finally, output the text information in each region of the sample image as a text knowledge tag of the image.

S3, Real-Time Updating

Knowledge point tags of input fine art work image samples are recorded by the tag model database in real time, and a common tag and a model are established according to the fine art work image samples uploaded for a plurality of times; subsequently contents relevant to the common tag are increasingly pushed, and pushed contents are updated according to fine art work images uploaded by the user in real time, where in this process, if the user subsequently uploads a new image of other category unrelated to an original image subject, a new model is established based on the new image and a subject of the new image.

S4, Generation of a User Portrait

After use by the user for a period of time, the fine art work image samples uploaded by the user and the tag data of the retrieved images are synthetically analyzed to generate the user portrait.

When applied to ordinary learners, the present disclosure further has a function "wrong homework collection". If a user uploads an image in the wrong homework collection, the present disclose allows for recommendation of excellent drawing images and related materials and videos having a tag of a same category based on a tag identified from the image. Thus, the learning efficiency of fine art students is greatly improved and the learning difficulty is reduced.

It needs to be noted that same knowledge points of individual data models of different training samples in the database are associated with one another. Since each image may have a different tag category, different contents, and a different number of knowledge points, the number of tags that can be successfully identified by the system is also different. Therefore, associations of models are combined and ranked by a same number of tags that can be successfully identified. Meanwhile, tags are divided into large tags and small tags by importance.

In case of a different number of large tags: for example, "intuitive knowledge-article classification tag" is a large tag, and "article classification tag-earthen jar" is a small tag. The association logic sequence of models follows the sequence from "large tag" to "small tag", and associations are arranged by a same number of tags. If a color image is input, the system identifies the content of the image and extracts as many knowledge point tags conveyed by the image as possible, and combines a plurality of tags extracted from the image into a single image data model. The more the same large tags, the closer the association. The more closely associated images are set to be pushed preferentially.

FIG. 7 is a diagram illustrating an extraction process of Example 7 of the present disclosure. As shown in FIG. 7, Example 7: taking a color still-life gouache image for example, an image of a still-life gouache is input; retrieval is performed according to the principle of an overall number of small tags; images are searched for based on the image in accordance with the single data model in the database; and images related and similar to but different from the image and related text and video materials are displayed according to the categories of intuitive knowledge and non-intuitive knowledge. At this time, the images may be ranked in sequence according to the same overall number of small tags. If a user taps on a recommended image, images may be recommended continuously based on a common tag of the two images, and if the user continues to tap, the number of the common tags may decrease gradually, and the location trends to be accurate. More similar and accurate materials will be ranked top, and on the contrary, less accurate materials will be ranked bottom.

Images having a same number of large tags may be arranged according to a set logic, and the specific logic is as follows.

1, setting by the overall number of small tags: if the number of large tags of the model is the same and the numbers of small tags under the large tags are different, the more the small tags, the closer the association, and the more closely associated images will be pushed preferentially by the system in retrieval.

2, arrangement by the same number of small tags in large tag priority: arrangement by the same number of small tags in a first large tag is preferred; and when the small tags in the first large tag are the same, images are arranged in sequence on the basis of the same number of small tags in a second large tag.

It needs to be that the arrangement and push sequence of the large tags may be set manually. However, due to the specialization of fine art learning, the setting logic should comply with the emphases of the united examination of fine arts. Therefore, the default push sequence setting of the system is described in accordance with the emphases and contents of the united examination of fine arts.

Taking the scoring criteria and score proportions of the color subject of Guangdong for example (the contents in the brackets are tags summarized by the writers according to the scoring points of the united examination), the settings are as follows:

meet the specifications and requirements of the test question; having definite hue awareness and good color feeling, reasonable composition, definite and vivid color relationship, and aesthetic drawing; close color and shape combination, vivid expression, in-depth shape depiction, and good overall drawing effect. Score proportions are shown below:

1. Composition: 15% (subject information knowledge, article information knowledge, spatial knowledge, etc.)
2. Structure and ratio: 35% (structural perspective knowledge, spatial knowledge, etc.)
3. Details and depiction: 25% (depiction degree Knowledge, black-white-grey relationship knowledge, etc.)
4. Expression technique: 25% (technique knowledge, fuzzy and clear knowledge, etc.)

Therefore, on this basis, the default sequence setting of the large tags of the system may be as follows: 1. Structural perspective knowledge; 2. Spatial knowledge; 3. Depiction degree Knowledge; 4. Black-white-grey relationship knowledge; 5. Technique knowledge; and 6. Fuzzy and clear knowledge.

Example 8: images are arranged according to the same number of small tags in the large tag priority, and it is assumed that the sequence setting of the large tags of the system is as follows: 1. Subject information; 2. Article information; 3. Black-white-grey relationship knowledge; . . . ; 6. Fuzzy and clear knowledge . . . .

If a color still-life image is input, the subject information identified from the image is color still-life tag, and the drawing has article information small tags such as earthen jar, apple, white plate, and board, and the system will recommend to push images that are also color still-life images and have the article information small tags such as earthen jar, apple, white plate, and board. The images, videos and text description materials related to the first and second large tags are ranked top, followed by related information of the tags. If the user does not tap on the related image information of the first and second tags at this time and it is assumed that the user taps on the image information of the sixth tag, the system will change the emphasis and push images similar to the image with respect to the sixth tag.

The retrieval and push method based on a fine art image is used in a fine art teaching institution.

The tag model database is a model established based on fine art drawing images uploaded by all students in the fine art teaching institution, and user portraits of all the students are generated to facilitate knowing the learning progress and the learning conditions of all the students such that a teaching program is adjusted and targeted teaching is realized.

It needs to be noted that from the common general knowledge in the art, fine arts are divided into large categories such as sketch, color, and hasty sketch, and color is subdivided into drawing categories with colors such as gouache, watercolor, and oil painting. To illustrate the present disclosure, the extraction processes of the above-mentioned knowledge points are described by taking a certain drawing for example. A person skilled in the art should be able to undoubtedly obtain the processing process of the drawings of the same category. Therefore, the foregoing embodiments should be construed as illustrative of rather than limiting of the technical solutions.

It further needs to be noted that a fine art drawing which is composed of different elements and symbols has the characteristics of specialization, artistry, strong visuality, etc. Therefore, with increasing data, the data of a single drawing can reflect a huge amount of fine art knowledge and a huge number of knowledge tags and can also convey very complicated information. Therefore, the present disclosure is illustrated merely by taking the special visual and indirect knowledge for example herein, and the basic ideas for other undiscussed knowledge are consistent. The present disclosure is applicable to institutions requiring accurate fine art data, data trainers, and artificial intelligence. Different algorithms are utilized to identify image information; visual and non-visual contents are summarized; regularities are summarized; a tag dataset is formed, facilitating associated push, management, and retrieval of knowledge points in subsequent use. Therefore, the present disclosure can effectively improve the learning efficiency of fine art students and reduce the learning difficulty. Meanwhile, the present disclosure is beneficial to establish smart fine art education, form a digital governance system and mechanism for fine art education, and promoting digital transformation of fine art education scenes.

Finally, it should be noted that the foregoing embodiments are only intended to describe, rather than to limit the technical solutions of the present disclosure. Although the present disclosure is described in detail with reference to the preferred embodiments, a person of ordinary skill in the art should understand that modifications or equivalent replacements may be made to the technical solutions of the present disclosure without departing from the spirit and scope of the technical solutions of the present disclosure.

What is claimed is:

1. A retrieval and push method based on a fine art image tag, comprising the following steps:

training different tag contents with training samples of different subjects and different categories, and categorizing the training samples in a database according to knowledge point tags to obtain a tag model database, wherein the training the tag model database comprises:

creating a training data set by collecting a plurality of fine art work images and annotating the plurality of fine art work images for knowledge point tags of the fine art work images, and then performing self-supervised training to obtain a learning-enabled image annotation system; and training unannotated fine art work images input continuously and annotated images in the database by semi-supervised learning, wherein by the semi-supervised learning, the input unannotated fine art work images are predicted and annotated continuously to form dummy tags which are incorporated into the training data set for continuous learning to enhance the robustness of the learning-enabled image annotation system; and a new training database is represented as follows:

$$D=\{(x_1,y_1), \ldots (x_1,y_1), x_{l+1}, \ldots x_m\}$$

wherein $(x_1, y_1) \ldots (x_1, y_1)$ refer to series of annotated images $(x_1 \ldots xl)$ and their corresponding annotations $(y_1 \ldots y_1)$, and $x_{l+1}, \ldots x_m$ corresponds to unannotated images in the tag model database, wherein m represents a total number of images, l represents number of annotated images in the tag model database, and (m−l) represents unannotated images out of the total number of images in the tag model database;

uploading fine art work image samples to the trained tag model database, then extracting knowledge point tags of the fine art work image samples, retrieving associated fine art works, and then separately determining the fine art work image samples according to the extracted knowledge point tags of the fine art work image samples;

pushing associated fine art works according to the fine art work image samples uploaded by a user and displaying the associated fine art works and tag data of retrieved images to the user;

recording knowledge point tags of the fine art work image samples by the tag model database in real time, and establishing a common tag and a model according to the fine art work image samples uploaded for a plurality of times by the user, subsequently pushing contents relevant to the common tag, and updating pushed contents according to fine art work images uploaded by the user in real time, wherein in the process, if the user subsequently uploads a new image of other category which is unrelated to an original image subject, a new model is established based on the new image and a subject of the new image; and analyzing the fine art work image samples uploaded by the user and the tag data of the retrieved images to generate a user portrait, wherein the user portrait includes the fine art work image samples uploaded by the user and the tag data of the retrieved images.

2. The retrieval and push method based on the fine art image tag according to claim 1, wherein the knowledge point tags comprise intuitive knowledge and indirect knowledge, wherein the intuitive knowledge comprises subject information knowledge, article information knowledge, dominant hue knowledge, color cold-warm relationship knowledge, black-white-grey relationship knowledge, spatial knowledge, technique knowledge, depiction degree Knowledge, object dynamic knowledge, character feature knowledge, ratio knowledge of the five sense organs, body block surface knowledge, structural perspective knowledge, level relationship knowledge, and drawing paper wear directly read from the fine art work image samples; and the indirect knowledge comprises text knowledge and video knowledge.

3. The retrieval and push method based on the fine art image tag according to claim 2, wherein extracting article information knowledge comprises the following steps:

training a convolutional neural network (CNN), then inputting a sample of a fine art work image, identifying a content of the fine art work image using a depthwise separable convolutional neural network, and extracting articles of different forms, followed by tagging the articles in the fine art work image using a SoftMax classifier, and attaching a disciplinary attribute tag to the articles involved in the fine art work image sample using a multi-head attention mechanism; and when the sample of the fine art work image is a still-life sketch, the following steps are performed:

detecting sketched still-life object on an input training sample, training a yolov5 network model through still-life detection of the sketch image and with tag data, then performing mask prediction at a Neck network of the yolov5 network model by means of a PANET structure, performing optimization using GIOU_Loss as an objective function for sketched still-life detection to obtain an optimal yolov5 still-life detection model for sketch images, and outputting a predicted still-life category and predicted still-life region information by means of non-maximum suppression processing, and performing clipping and outputting according to coordinates of the predicted still-life region;

after the completion of the training, for an input sample, performing prediction by loading parameters of the optimal yolov5 still-life detection model for sketch images to obtain the predicted still-life category, and clipping the sketch image according to the coordinates of the predicted still-life region, and outputting each still-life image in the fine art work image sample sketch image which is the still-life sketch and the disciplinary attribute tag;

wherein the objective function of GIOU_Loss is as follows:

$$IoU = \frac{(A \cap B)}{A \cup B}$$

$$GIoU = IoU - \frac{C - (A \cup B)}{C}$$

$$\mathcal{L}_{GIoU} = 1 - GIoU$$

wherein A and B represent areas of two predicted intersection over union (IOU) boxes, and C represents a minimum area surrounding A and B.

4. The retrieval and push method based on the fine art image tag according to claim 2, wherein extracting the black-white-grey relationship knowledge comprises the following steps:

inputting a fine art work image sample, extracting a brightness relationship from a black-and-white image or a black-and-white image converted from a color image, analyzing the black-and-white image as a whole according to area proportions of different brightness color blocks in the black-and-white image, determining a black-white-grey relationship to categorize the color blocks into black, white and grey and, and after analyzing the brightness relationship, giving a brightness tag and an excellence grade tag to the fine art work image sample; and wherein, when the fine art work image sample is a still-life gouache, the following steps are performed:

generating a grey image of an input still-life gouache sample using a grey image generation algorithm, obtaining a grey value Y for the grey image by using brightness of red, green, and blue (RGB) components and chromatic values U and V, and calculate an average to obtain good grey image quality in terms of perception and structure, wherein a calculation formula to calculate the average I1 is as follows:

$Y=(0.299\times R)+(0.587\times G)+(0.114\times B)$ $U=(B-Y)\times 0.565$ $V=(R-Y)\times 0.713$ $UV=U+V$ $R1=R\times 0.299$ $R2=R\times 0.587$ $R3=R\times 0.114$ $G1=G\times 0.299$ $G2=G\times 0.587$ $G3=G\times 0.114$ $B1=B\times 0.299$ $B2=B\times 0.587$ $B3=B\times 0.114$ $R4=(R1+R2+R3)/3$ $G4=(G1+G2+G3)/3$ $B4=(B1+B2+B3)/3$ $I1=(R4+G4+B4+UV)/4$ equally dividing the grey image into 10 rectangular color blocks, and calculating a main grey level of each color block by a K-means clustering algorithm, clustering pixel grey values of each color block, and minimizing a square sum of distances between grey levels of pixels in the rectangular color blocks and the grey levels of corresponding cluster centers by:

$$J = \sum_{n=1}^{N}\sum_{k=1}^{K} r_{nk}\|C(n) - u_k\|^2$$

wherein n represents coordinates of a pixel in a color block; C(n) represents a grey value of the pixel; N represents a number of pixels in each color block; and K represents a preset number of clusters, and $u_k$ represents a center of the preset number of clusters K;

taking a cluster having the most pixels in the color block as a main grey level cluster according to the K-means clustering algorithm, and taking a corresponding grey value of the cluster center obtained by the K-means clustering algorithm as the main grey level of the color block; and providing a black-white-grey attribute definition for each color block by presetting a threshold, and obtaining the black-white-grey attribute of each color block in accordance with the threshold and according to the calculated main grey level of the color block, calculating a rectangular area proportion of each grey level color block, and taking the black-white-grey attribute of the color block having the largest area as a tag of the input still-life gouache sample.

5. The retrieval and push method based on the fine art image tag according to claim 2, wherein extracting the color cold-warm relationship knowledge and the dominant hue knowledge comprises the following steps:

inputting a fine art work image sample, extracting color blocks from the fine art work image sample, obtaining a value of a color of each extracted secondary color block according to an RGB color look up table secondary colors of a color painting are obtained by mixing pigments, then defining a value range according to values of different colors in the fine art work image sample, classifying colors having values close to a pure color value as a same hue, and finally, comparing areas of different hues in the fine art work image sample and taking the hue having the largest area as a dominant hue, thereby categorizing the dominant hue of the fine art work image sample into cold or warm hue;

wherein, when the fine art work image sample is a still-life gouache, the following steps are performed:

equally dividing the image into 30 rectangular color blocks, and calculating a main RGB (red, green, blue) color value of each color block by a K-means clustering algorithm, applying the K-means clustering algorithm to the main RGB, clustering pixel colors of each color block, and minimizing a square sum of distances between RGB (red, green, blue) values of pixels in the 30 rectangular color blocks and RGB (red, green, blue) values of corresponding cluster centers by:

$$J = \sum_{n=1}^{N}\sum_{k=1}^{K} r_{nk}\|C(n) - u_k\|^2$$

wherein n represents coordinates of a pixel in a color block; C(n) represents an RGB value of the pixel; N represents a number of pixels in each color block; and K represents a preset number of clusters, and $u_k$ represents a center of the preset number of clusters K;

taking a cluster having the most pixels in the color block as a dominant hue cluster according to the K-means clustering algorithm, and taking a corresponding RGB (red, green, blue) value of a cluster center obtained by the K-means clustering algorithm as the main RGB (red, green, blue) color value of the color block; and identifying a hue for each color block and determining cold or warm attribute definition for each color block by presetting a threshold, and obtaining the dominant hue of each color block in accordance with the threshold and the calculated main RGB (red, green, blue) value of each color block, calculating a rectangular area proportion of each color block, taking a hue attribute of the color block having the largest area as a dominant hue tag of a still-life gouache sample, and giving a cold or warm hue tag of the fine art work image sample according to the cold or warm attribute definition.

6. The retrieval and push method based on the fine art image tag according to claim 2, wherein extracting spatial knowledge comprises the following steps:
    inputting a fine art work image sample, extracting and comparing a brightness of a blackest portion and a brightness of a whitest portion of a central region of the fine art work image sample to obtain a first value of a contrast, extracting and comparing the brightness of the blackest portion and the brightness of the whitest portion of a surrounding fuzzy region of the fine art work image sample to obtain a second value of another contrast, comparing the first and second contrasts, and determining that a space sense is weak if a difference of the first and second contrasts is less than a set value, otherwise determining that the space sense is strong;
    wherein, when the fine art work image sample is a still-life sketch, the following steps are performed:
    firstly, equally dividing the fine art work image sample into 36 image regions, and taking an annular central region and a main-body central region as a central region and a surrounding region as a fuzzy region, thereby categorizing the 36 image regions as central regions and fuzzy regions, respectively;
    secondly, clustering grey values or RGB (red, green, blue) values of each image region, extracting a brightness degree of each image region, and categorizing each image region as two types of clustering problems and clustering by a K-means clustering algorithm; clustering pixel colors of each image region by the K-means clustering algorithm, and minimizing a square sum of distances between the grey values or RGB (red, green, blue) values of pixels in each image region and the grey values or RGB (red, green, blue) values of corresponding cluster centers by:

$$J = \sum_{n=1}^{N}\sum_{k=1}^{K} r_{nk} \|C(n) - u_k\|^2$$

wherein n represents coordinates of the pixels in each image region; C(n) represents the grey values or RGB (red, green, blue) values of the pixels; N represents a number of pixels in each image region; and K represents a preset number of clusters, K being 2, and $u_k$ represents a center of the preset number of clusters K;
    taking the corresponding grey values or RGB values of two types of cluster centers obtained by the K-means clustering algorithm as a main brightness value and a main darkness value of a color block, respectively; and
    finally, obtaining differences of the main brightness values and the main darkness values of the central region and the fuzzy region, respectively, to obtain main light and shade contrasts of the the central and the fuzzy regions, then calculating a difference between the main light and shade contrasts of the central region and the fuzzy region, and obtaining a light and shade contrast difference feature of the the central and the fuzzy regions by threshold binarization; wherein, if the difference between the main light and shade contrasts is greater than a threshold, tagging the fine art work image sample with a strong space sense; and if the difference is less than the threshold, tagging the fine art work image sample with a weak space sense.

7. The retrieval and push method based on the fine art image tag according to claim 2, wherein extracting technique knowledge comprises the following steps:
    inputting a fine art work image sample, delimiting a position of a main object in the fine art work image sample, extracting an area range of the main object, extracting a highlight of the main object, determining brush strokes of the fine art work image sample based on techniques entered in the database, and categorizing the fine art work image sample as good if the brush strokes or a line arrangement are/is clear, tough, and definite, otherwise, categorizing the fine art work image sample as bad; and
    wherein, when the fine art work image sample is a still-life sketch or a still-life color painting, the following steps are performed:
    firstly, establishing a brush stroke classification database with shape images of the brush strokes and brush stroke category tags based on training samples, and establishing a line arrangement classification database with shape images of different line arrangement methods and line arrangement category tags; then inputting the training samples to a multi-branch integrated CNN (Convolutional Neural Network) for training, and optimizing a cross-entropy loss function to obtain optimal brush stroke identification and line arrangement identification models, wherein the cross-entropy loss function is as follows:
    L=−y log ŷ+(1−y) log (1−ŷ), wherein y is an actual value obtain by the optimal brush stroke identification and the line arrangement during the training, and ŷ represents a predicted value, obtained after the training is completed, computed by the multi-branch integrated CNN (Convolutional Neural Network) and the optimal brush stroke identification and line arrangement identification models;
    secondly, detecting a central region of the main object of the fine art work image to obtain an approximate region of each object in the fine art work image; and
    finally, obtaining brightest and darkest coordinate points in the fine art work image by a K-means clustering method, extracting a brightest image region, identifying a brush stroke category or a line arrangement category of the image region by the trained multi-branch integrated CNN (Convolutional Neural Network), and classifying the identified image region as a clear brush stroke/line arrangement and an unidentified image region as unclear brush stroke/line arrangement.

8. The retrieval and push method based on the fine art image tag according to claim 2, wherein extracting text knowledge comprises the following steps:
    firstly, detecting a target text on an input image by a trained connectionist text proposal network (CTPN) model, wherein the connectionist text proposal network (CTPN) model is densely slid in last convolution mapping of a VGG16 model by a 3*3 space window, wherein sequential windows of each row are connected by a bidirectional long short-term memory (LSTM) cycle, wherein a convolution feature 3*3*C of each window is used as an input to 256D BLSTM, wherein "C" refers to a number of channels for the convolution mapping of the VGG16 model, and a recurrent neural network (RNN) layer is connected to a 512D fully connected layer and then to an output layer; text/non-text scores, y-axis coordinates, and offsets of k anchor points are predicted together; the connectionist text proposal network outputs an elaborate text box with a continuously fixed width; and the input image is clipped according to a predicted text box to obtain a text region of the input image;

secondly, identifying a text in the detected text region by a trained convolutional recurrent neural network-connectionist temporal classification (CRNN-CTC) network, wherein the trained convolutional recurrent neural network-connectionist temporal classification (CRNN-CTC) network firstly performs downsampling by a CNN (Convolutional Neural Network) to obtain a feature map of the text in the input image, extracting a feature from a sequential code of the feature map by an RNN (Recurrent Neural Network), mapping the sequential code to a prediction of the text in the input image text, and outputting text information in the input image by a feature description layer; and finally, outputting the text information in each region of the input image as a text knowledge tag of the input image.

\* \* \* \* \*